US 6,672,514 B1

(12) United States Patent
Brennan et al.

(10) Patent No.: US 6,672,514 B1
(45) Date of Patent: Jan. 6, 2004

(54) PORTABLE SMART CARD READER ASSEMBLY

(75) Inventors: Denise Brennan, Ennis (IE); Michel Chomette, Ventabren (FR); Colin Conlon, Loughrea (IE); John Horgan, Limerick (IE); Gavin Warner, Ennis (IE); Pat White, Ennis (IE)

(73) Assignee: Molex Incorportated, Lisle, IL (US)

( * ) Notice: Subject to any disclaimer, the term of this patent is extended or adjusted under 35 U.S.C. 154(b) by 0 days.

(21) Appl. No.: 09/589,708

(22) Filed: Jun. 8, 2000

(30) Foreign Application Priority Data

Jun. 8, 1999 (EP) .............................. 99111137

(51) Int. Cl.[7] .............................................. G06K 19/06
(52) U.S. Cl. ...................................... 235/492; 235/441
(58) Field of Search ................................. 235/492, 441, 235/475, 486, 487; 361/755, 756, 737

(56) References Cited

U.S. PATENT DOCUMENTS

| 5,375,037 A | | 12/1994 | Le Roux | |
|---|---|---|---|---|
| 5,386,340 A | | 1/1995 | Kurz ........................... | 361/737 |
| 5,402,095 A | * | 3/1995 | Janniere ..................... | 200/292 |
| 5,546,278 A | | 8/1996 | Bethurum .................... | 361/737 |
| 5,548,485 A | | 8/1996 | Bethurum et al. .......... | 361/737 |
| 5,673,180 A | | 9/1997 | Pernet ......................... | 361/756 |
| 5,750,973 A | * | 5/1998 | Kaufman et al. ............ | 235/441 |
| 5,768,110 A | * | 6/1998 | Frommer et al. ........... | 174/35 R |
| 6,024,593 A | * | 2/2000 | Hyland ........................ | 235/441 |
| 6,247,968 B1 | * | 6/2001 | Wu .............................. | 361/737 |
| 6,293,464 B1 | * | 9/2001 | Smalley, Jr. ................. | 235/435 |
| 6,333,860 B1 | * | 12/2001 | Oliphant et al. ............ | 361/818 |

* cited by examiner

Primary Examiner—Thien M. Le
Assistant Examiner—Lisa M. Caputo
(74) Attorney, Agent, or Firm—Stacey E. Caldwell

(57) ABSTRACT

A portable smart card reader assembly having an upper housing unit (25) having a first mounting structure (28,29), and a lower housing unit having a second mounting structure (20, 21), the upper housing unit (25) and the lower housing unit (12) together defining a cavity (50) for accommodating an electronic insert (17), the electronic insert (17) having a connector (2) for establishing electric contact with an associated electronic device and a contact array (8) having terminals (51, 52) designed to mate with contact pads on a smart card (7) upon insertion of the smart card (7) into the portable smart card reader assembly (1), wherein upon mating the upper housing unit (25) with the lower housing unit (12) the first mounting structure (28,29) and the second mounting structure (20, 21) move into locking engagement.

17 Claims, 8 Drawing Sheets

PORTABLE SMART CARD READER ASSEMBLY

FIELD OF THE INVENTION

The present invention relates to a portable smart card reader assembly serving to provide connection between an electronic smart card and a further electronic device, e.g. a reader of the kind as used for PCMCIA type cards

BACKGROUND OF THE INVENTION

The term "smart card" is used below to designate cards of essentially rectangular shape, such as bank cards, prepayment cards for public telephones, pay TV services, security cards or personal authentication cards. The format of such cards is standardized and each of them carries an array of contact pads which is situated at a specific predefined location on the main surface of the card and is connected with other electronic circuitry for performing respective electronic operations.

In computers, especially personal computers, lap- or palmtops it is becoming increasingly common to use electronic PCMCIA plug-in cards having a similar format as a smart card but of greater thickness. This type of card has been standardized by the "Personal Computer Memory Card International Association" (PCMCIA), and in particular many desk top and nearly all portable computers, include a PCMCIA type card reader. The term "PCMCIA card" is used below not only for all cards that do indeed comply with the PCMCIA standard, but also for any similar cards that are substantially rectangular in shape, and that are terminated at one end by a connector mateable with the male connector of the PCMCIA card reader. Further, the term "reader" is not limited here to an electronic device performing a read operation but shall also cover any read and/or write devices.

Special card readers are known that are capable of reading both smart cards and PCMCIA type cards. Such readers generally include an adapter enabling them to adapt to the differences of card thickness, and also two different types of electrical connector, i.e. PCMCIA type and smart card type. By way of example, this type of reader is described in French patent application FR 2 687 238 and U.S. Pat. No. 5,198,645.

Another solution described in European patent application EP 0 552 078 consists of reducing the thickness of a PCMCIA card and in fitting an additional connector with flush contacts on its main face.

A still further solution is proposed by U.S. Pat. No. 5,296,692 which describes an adapter capable of being inserted into a reader. The adapter includes a receptacle that can receive a PCMCIA type card and a smart card, the cards being positioned one above the other. This results in the slot through which the cards are inserted being of greater width than the slot of a conventional card reader so that the adapter does not have standard dimensions and cannot be used directly with an ordinary PCMCIA type card reader.

U.S. Pat. No. 5,548,485 teaches a cover assembly for IC cards is known where a soldering and spot welding techniques are adopted for mounting of different parts of the assembly. However, often hybrid circuitry and surface mounted components are vulnerable to external heat and are not apt to be incorporated in a housing as described in this document.

U.S. Pat. No. 5,673,180 describes a case for a handheld microcircuit card reader. According to this design, it is not intended to transfer data from such a type of card reader to a computer or any other electronic device. Moreover, as smart cards having essentially the same widths as PCMCIA cards, this approach is not suited to be adapted to a PCMCIA smart card reader as bulky side walls of this prior art reader require more space as defined in the PCMCIA standards.

As it is becoming increasingly popular to use smart cards of different types for different purposes, it would be desirable to have a smart card reader assembly that can accommodate the associated different types of electronic circuitry and which conforms to the PCMCIA standards. Furthermore, it would be desirable to have a smart card reader assembly that is designed to adopt a plurality of different electronic circuits, especially electronic circuitry that is not vulnerable to external heat, inasmuch as thick film layers or hybrid circuitry containing surface mounted components can encounter weakened contacts after exposure to undue thermal influence.

SUMMARY OF THE INVENTION

Accordingly, it is an object of the invention to provide a smart card reader assembly for which no soldering, no welding and no thermal mounting operations, are necessary during manufacturing.

It is a further object of the invention to provide a smart card reader assembly for which a minimum amount of parts is necessary and that is able to be assembled manually as well as robotically.

A still further object of the invention is to provide a smart card reader assembly that can accommodate a variety of different electronic inserts.

The above objects are achieved with a smart card reader assembly comprising an upper housing unit having a first set of mounting means, and a lower housing unit having a second set of mounting means, said upper housing unit and said lower housing unit together defining a cavity for accommodating an electronic insert, said electronic insert comprising a receptacle connector for establishing electric contact with an associated electronic device and a contact array having terminals designed to mate with contact pads on a smart card upon insertion of the smart card into the portable smart card reader assembly, wherein upon mating said upper housing unit with said lower housing unit said first set of mounting means and said second set of mounting means are moved into locking engagement.

In a preferred embodiment, said first set of mounting means comprises at least one generally u-shaped lateral mounting flange and said second set of mounting means comprises at least one essentially inwardly inclined mounting flange to provide a mechanical snap-fit connection upon mating both housing units.

In another embodiment said at least one generally u-shaped lateral mounting flange is a laterally bent portion of an upper sheet metal cover of the upper housing unit and said at least one essentially inwardly inclined mounting flange is a laterally bent portion of a lower sheet metal cover of the lower housing unit, thus providing the necessary flexibility and rigidity for a snap-fit connection.

Preferably, said lower housing unit comprises a beveled dielectric front edge unit to facilitate insertion of the smart card into the reader assembly and precise and stable external dimensions are obtained if said upper housing unit defines laterally guiding flaps laterally engaging said beveled dielectric front edge unit of said lower housing unit upon mating of both housing units.

A convenient solution for guiding the smart card upon insertion without any lateral guiding element and a small and dense assembly is realized when said upper housing unit comprises a dielectric top cover extending spaced from and above the upper sheet metal cover and when said dielectric top cover and said upper sheet metal cover define a laterally open slot for inserting said smart card.

Additional rigidity in terms of shock and vibration resistance is obtained if said dielectric top cover further defines mounting portions for mounting lateral flaps of the lower sheet metal cover, said mounting portions comprising at least one longitudinal opening for press fit engagement of the lateral flaps of the lower sheet metal cover.

It is contemplated that the smart card reader assembly be manufactured according to the PCMCIA standards interface.

Other objects and advantages of the present invention will be understood from the following description of a smart card reader according to a preferred embodiment of the invention in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENT

Figure 1:
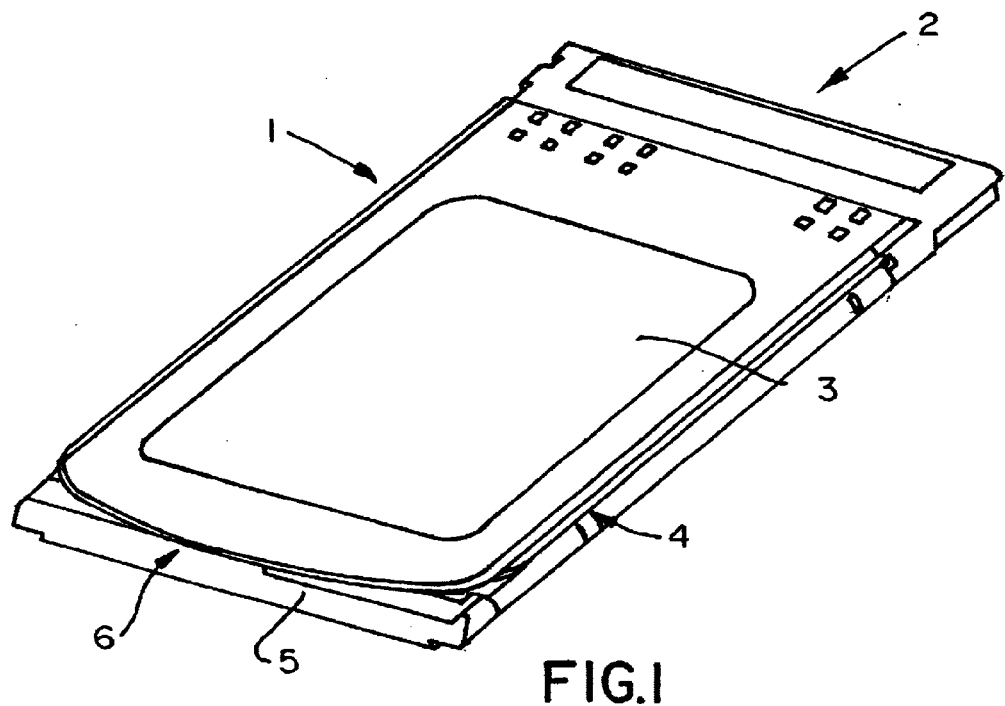
FIG. 1 is a perspective view of a first embodiment of the smart card reader that enables a single smart card to be inserted into the card reader assembly.

Reference is made now to FIG. 1 showing a perspective view of a first embodiment of the portable smart card reader assembly generally designated as 1 and having the external dimensions of a PCMCIA card according to the PCMCIA standard. At a rear edge of the smart card reader assembly 1, there is located a receptacle or header connector 2 for establishing electric contact with an external device such as a PCMCIA card read/write device. The receptacle connector 2 comprises 68 female terminals in compliance with the PCMCIA standard.

A flap 3 consisting of dielectric material defines a laterally open slot 4 together with the remaining portion of the smart card reader assemblies housing.

Figure 2:
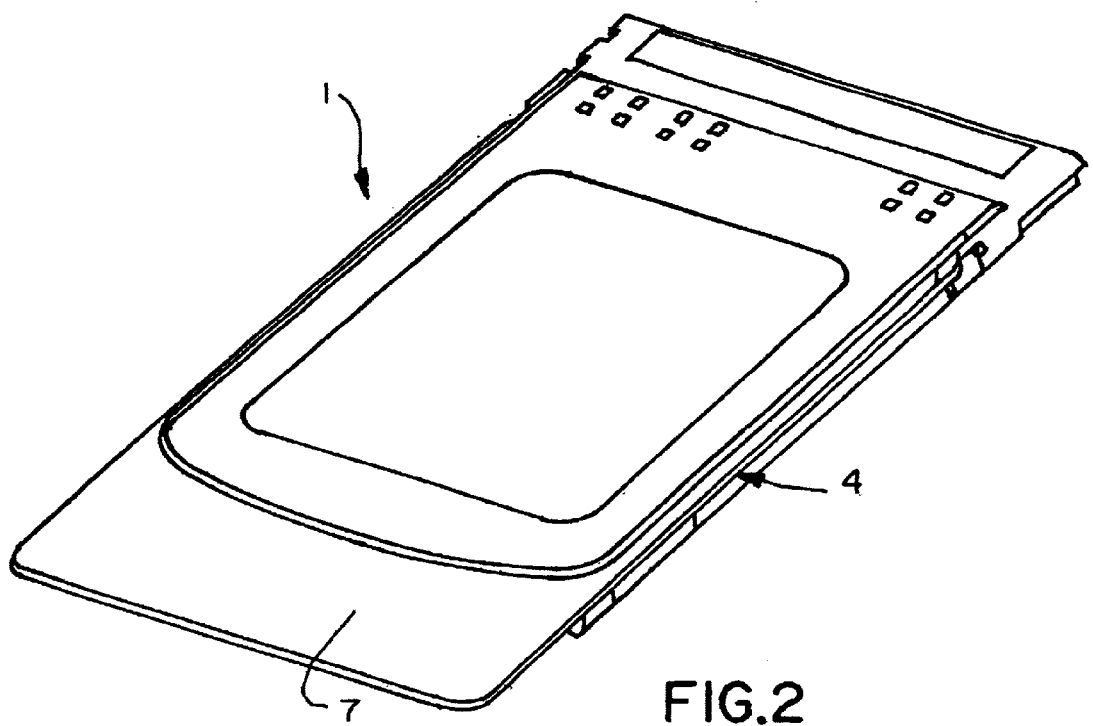
FIG. 2 is a perspective view of the first embodiment of the smart card reader with a single smart card inserted into the card reader assembly.
Figure 3:
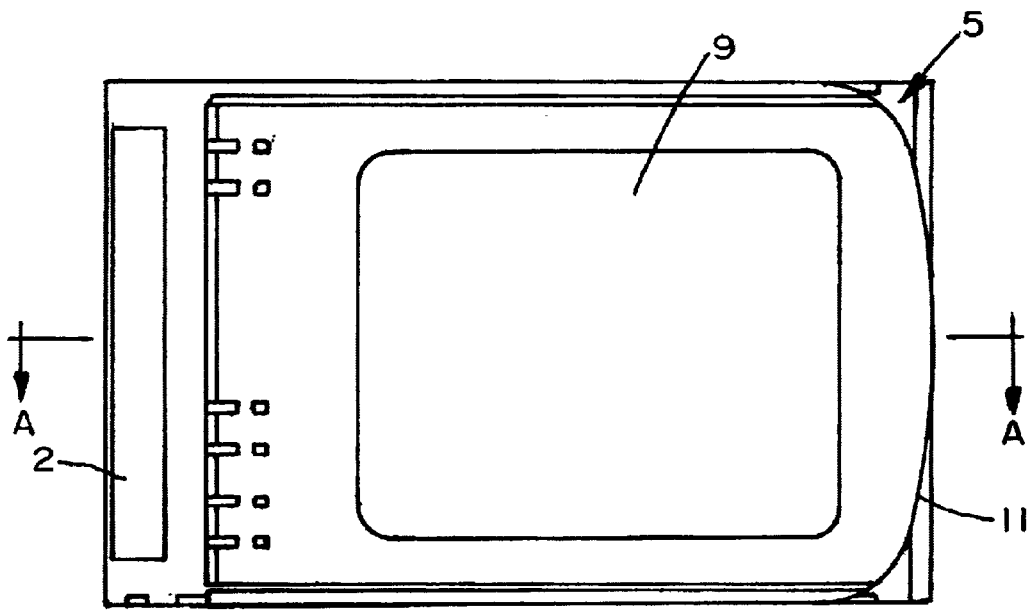
FIG. 3 is an elevated side plan view of a card reader assembly according to the first embodiment.
Figure 12:
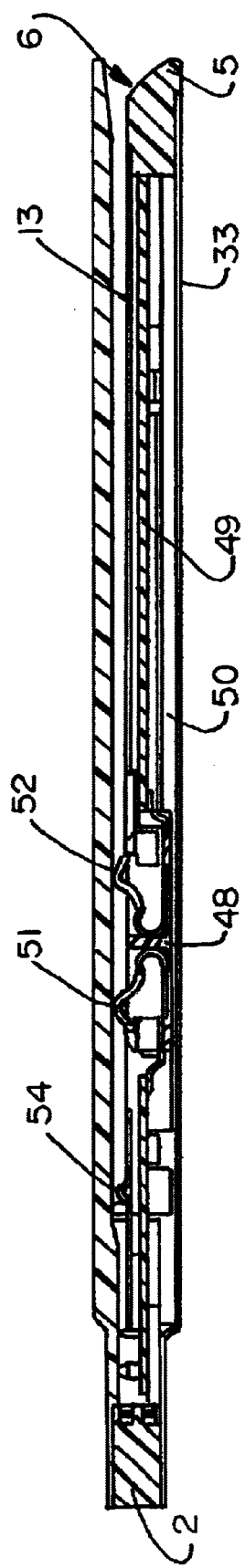
FIG. 12 shows a cross sectional view along line AA of FIG. 4.
Figure 13:
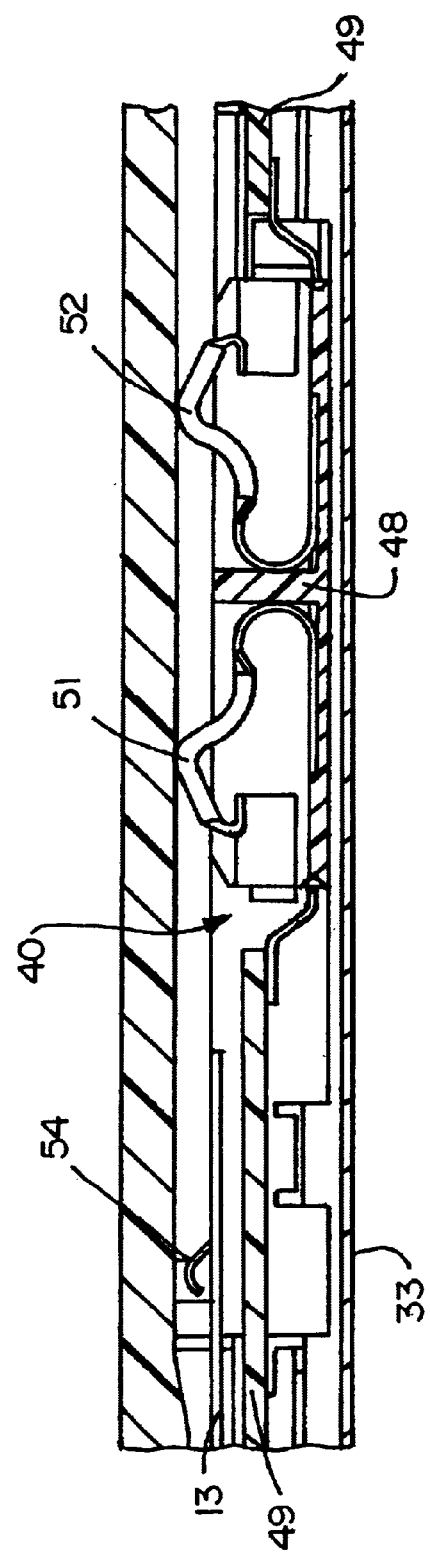
FIG. 13 is an enlarged detail of the cross sectional view of FIG. 13 in the card readers smart card terminal area.

At a front edge of the smart card reader assembly 1 a generally u-shaped beveled dielectric front edge unit 5 is located defining, as may be best seen from FIGS. 3 and 12 a front edge mouth 6 having an essentially funnel-shaped cross sectional area for inserting a smart card 7 as shown in FIG. 2. As the lateral dimensions, i.e. the width of the smart card 7 is essentially the same as of the smart card reader assembly 1, no lateral guiding elements are needed for correct positioning of the smart card 7 relative to the smart card reader assembly 1 as lateral guidance is provided by a PCMCIA slot into which the smart card reader assembly 1 is inserted for a respective operation thereof.

From FIG. 2 it may be seen that in the inserted position a front portion of the smart card 7 projects forward relative to the laterally open slot 4 and facilitates insertion and withdrawal of the card 7. Moreover, if the smart card reader assembly 1 is inserted into a PCMCIA slot of a smart card read/write device then smart card 7 will slightly project out of the housing of the smart card read/write device and may easily be handled for the respective purposes.

Figure 4:
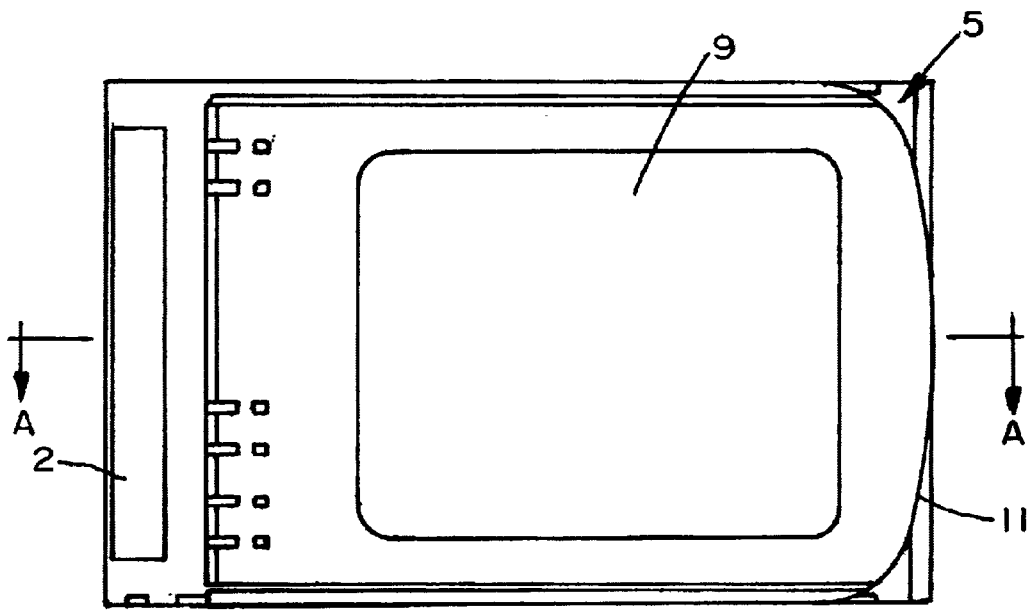
FIG. 4 is an elevated top plan view of a card reader assembly according to the first embodiment.
Figure 5:
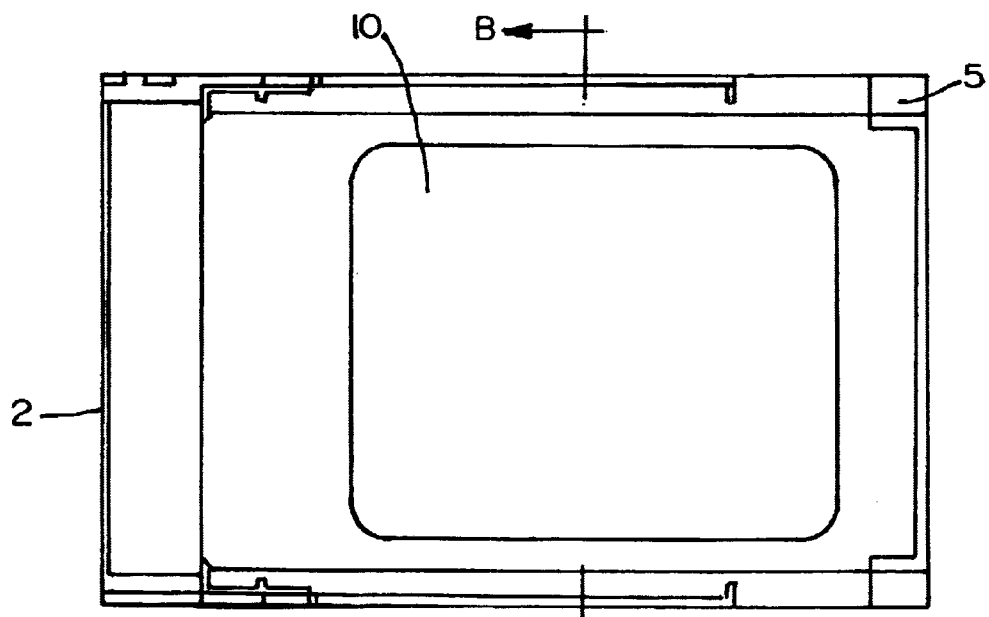
FIG. 5 is an elevated bottom plan view of a card reader assembly according to the first embodiment.
Figure 11:
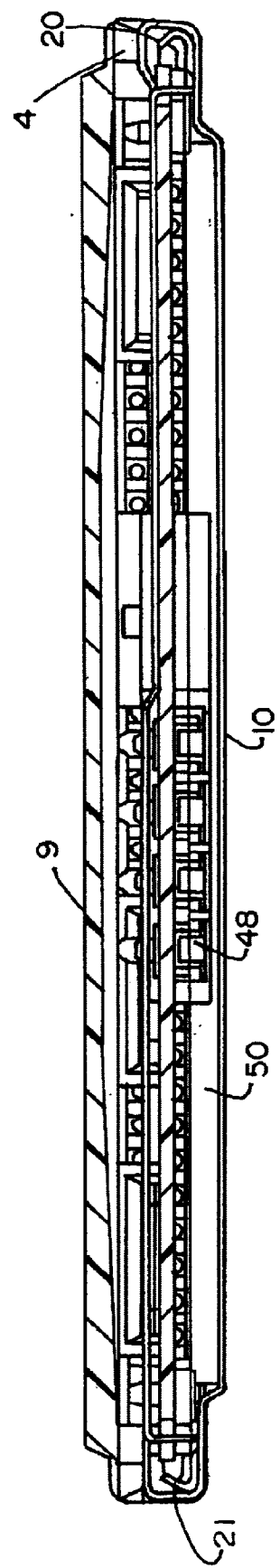
FIG. 11 is a complete cross sectional view along line BB of FIG. 5.

FIG. 3 shows an elevated side plan view wherefrom the location of a contact array 8 for establishing electric contact with contact pads on the smart card is seen. From the elevated top and bottom plan views of FIGS. 4 and 5 as well as from FIG. 11 essentially tub-shaped embossed areas 9 and 10 are seen. Further, FIG. 4 shows the rounded front edge portion 11 of dielectric flap 3 serving to facilitate insertion of smart card 7. From FIG. 5 the generally u-shaped configuration of beveled front edge unit 5 is seen.

Figure 6:
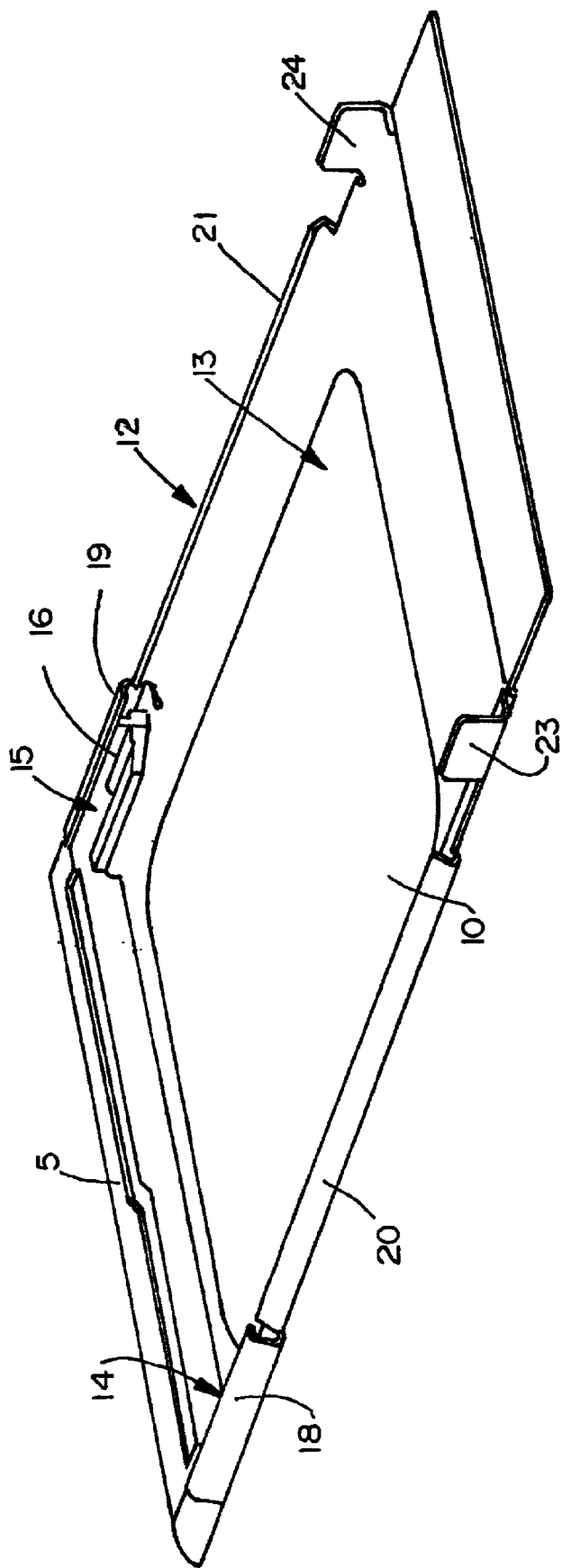
FIG. 6 is a perspective view of the lower housing unit of the first embodiment of the smart card reader.

Reference is made now to FIG. 6, showing a perspective view of the lower housing unit 12 comprising beveled front edge unit 5 mounted at a front edge of lower sheet metal cover 13 which has an essentially plane body portion with the tub-shaped area 10 embossed to the outside of the smart card reader assembly 1.

Figure 8:
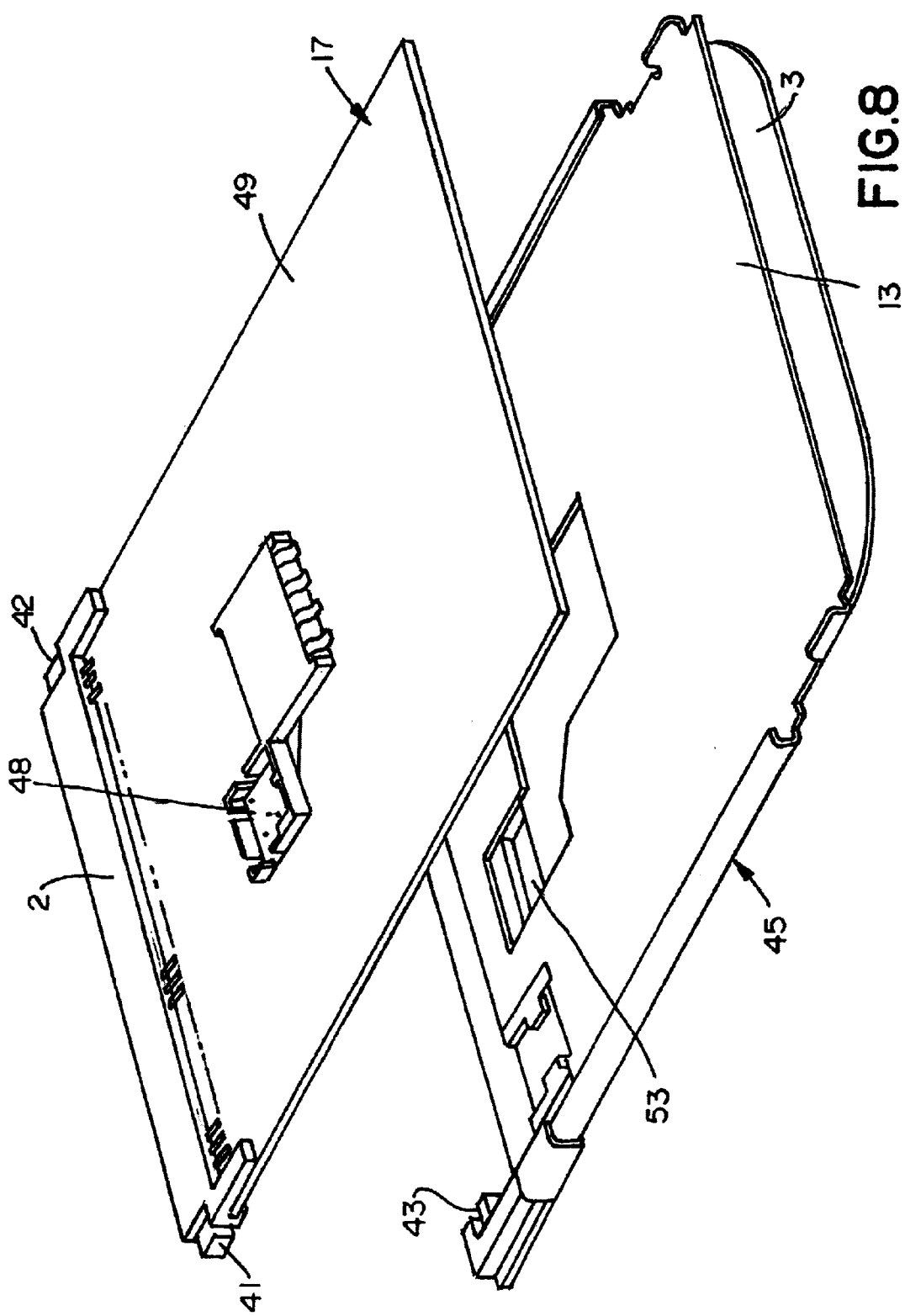
FIG. 8 is a perspective view of the upper housing unit of the first embodiment of the smart card reader with an electronic insert in a position relative to each other as encountered in advance of mounting said electronic insert in the upper housing unit.
Figure 9:
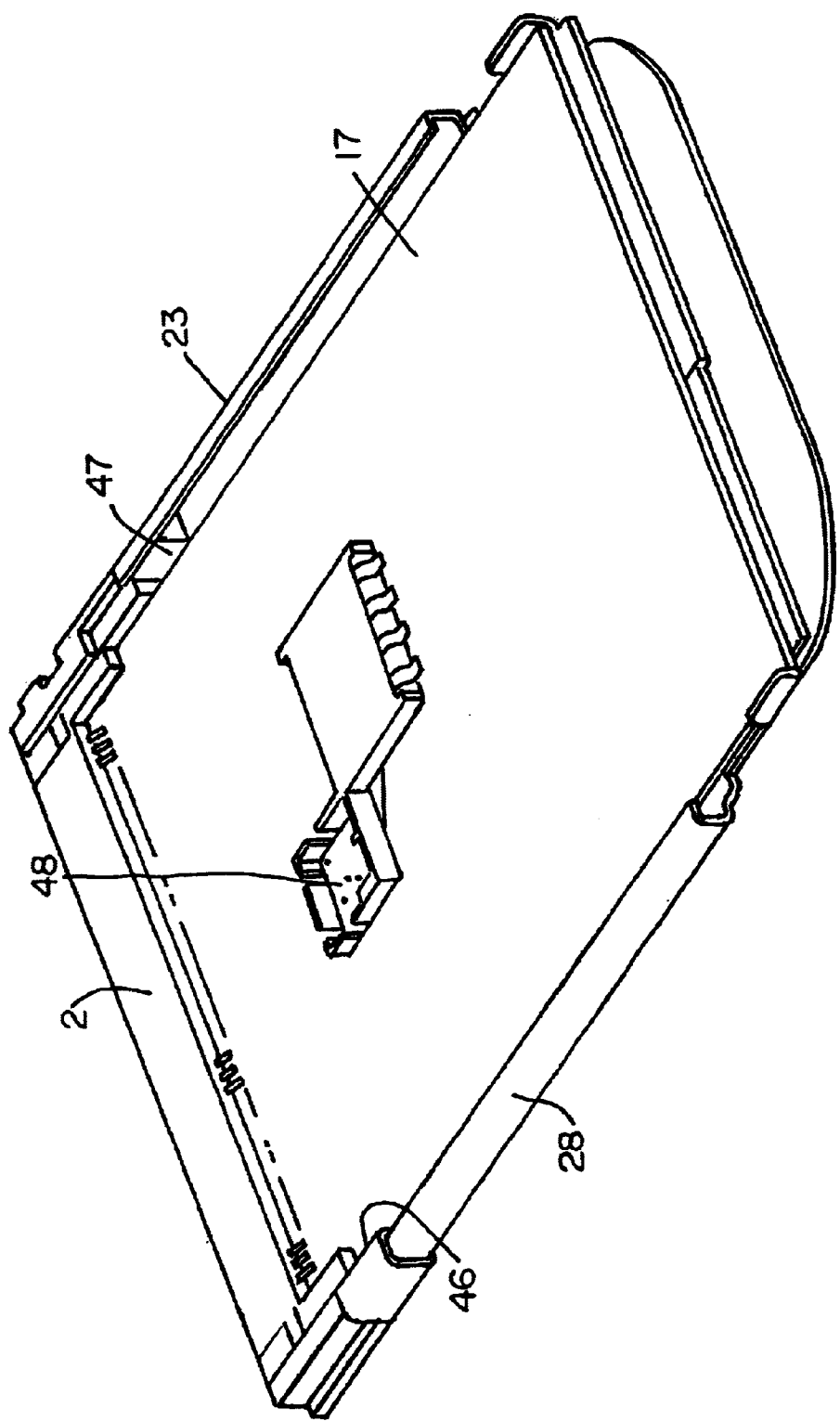
FIG. 9 is a perspective view of the upper housing unit of the first embodiment of the smart card reader with the electronic insert placed in the upper housing unit.

Beveled front edge unit 5 defines a pair of parallel legs 14, 15 having an essentially L-shaped cross-sectional area and an adjusting projection 16 for position adjustment of a printed circuit board of an electronic insert 17 which insert may be seen from FIGS. 8 and 9. L-shaped legs 14, 15 of beveled front edge unit 5 are in tight, press-fit engagement with essentially unshaped lateral mounting flanges 18, 19 of lower sheet metal cover 13.

Figure 10:
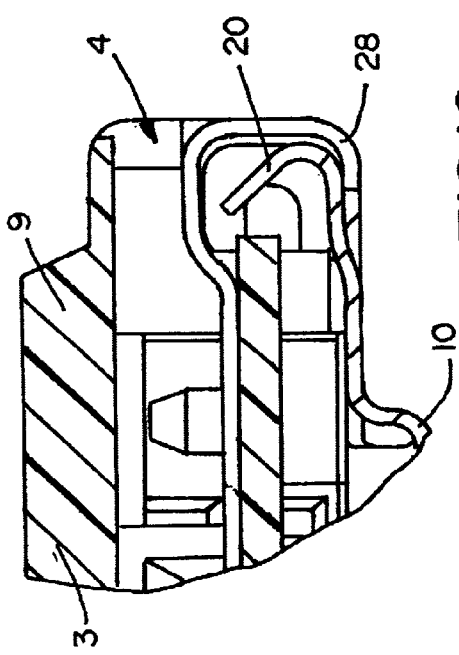
FIG. 10 is an enlarged cross sectional view of the right edge portion of the card reader assembly along line BB of FIG. 5.

As may be best seen from FIG. 10, inwardly inclined mounting flange 20 extends under an angle of about 45° relative to the essentially plane body portion of lower sheet metal cover 13. As seen from FIG. 11, inwardly inclined mounting flange 21 in a similar manner symmetrically extends under an angel of about 45°. Mounting flanges 20 and 21 are lateral inwardly bent portions of sheet metal cover 13.

Further, lateral mounting flaps 23, 24 are lateral inwardly bent portions of lower sheet metal cover 13 extending essentially perpendicular relative to the main body portion of sheet metal cover 13.

Figure 7:
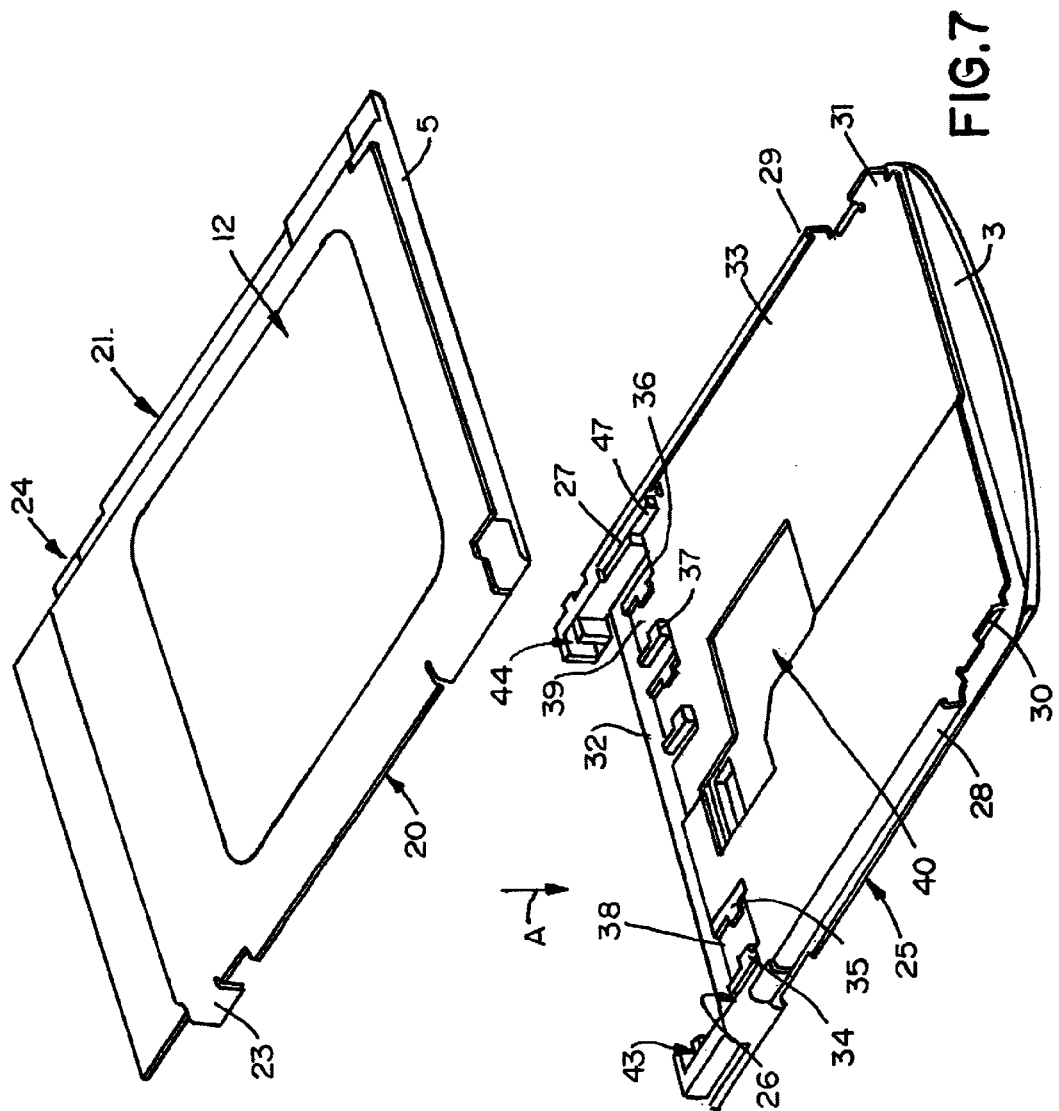
FIG. 7 is a perspective view of the upper and lower housing units of the first embodiment of the smart card reader in a position relative to each other as encountered in advance of mounting both housing units together.

From FIG. 7, especially from the perspective view of the upper housing unit 25, longitudinal openings 26 and 27 are seen into which mounting flaps 23 and 24 are pressed upon mating of upper housing unit 25 with lower housing unit 12.

Moreover, if lower housing unit 12 is moved in the direction of arrow A of FIG. 7 then lateral guidance is provided by mounting flaps 23, 24 being inserted into longitudinal slots 26 and 27 and further guidance is provided by lateral flaps 30, 31 of upper housing unit 25 getting into engagement with the outside surfaces of beveled front edge unit 5. Upon further moving lower housing unit 12 in the direction of arrow. U-shaped mounting flanges 28 and 29 contact inwardly inclined flanges 20 and 21 and will begin to ride on the outside surfaces of flanges 20, 21 causing flexible deformation of flanges 28, 29 to the outside and, subsequently, flanges 28, 28 snap over flanges 20 and 21 into a press-fit engagement as seen in FIG. 10. Thus, a plurality of mounting elements is provided for upper and lower housing units 12, 25, i. e. mounting flaps 23 and 24 along with longitudinal slots 26 and 27 as well as mounting flanges 20, 21 cooperating with u-shaped flanges 28, 29.

After pressing together both housing units 25 and 12, a cavity 50 is defined for accommodating the electronic insert 17 which insert is position-adjusted and firmly held by means of lateral projections 41, 42 extending to the right and left sides of the receptacle connector 2 which projections 41, shown in FIGS. 8 and 9, are tightly held by associated 42 as recesses 43, 44 of mounting portion 32 of top cover 45. To avoid any unwanted electrical contacts between electronic insert 17 and internal metal surfaces, said upper and said lower sheet metal covers 13, 33 are internally covered with an insulating layer consisting of an epoxy, a dielectric film layer or an insulating paint layer.

To correctly position top cover 45 relative to upper sheet metal cover 33, longitudinal lateral guide posts 46, 47 extend in parallel on the right and left sides of mounting portion 32 of top cover 45, respectively.

Further, mounting portion 32 defines upright standing, partially L-shaped side walls 34, 35, 36 and 37 for lateral press-fit engagement of mounting tabs 38 and 39 of upper sheet metal cover 33. As may be seen in FIGS. 7 and 8, flap 3 defines, together with mounting portion 32 for mounting the upper sheet metal cover 33, recesses 43 and 44 and longitudinal posts 46 and 47, the complete top cover 45.

Moreover, a central opening 40 of upper sheet metal cover 33 exposes defined areas of electronic insert 17 for establishing electric contact with associated contact pads on an inserted smart card or for exposing an area of the printed circuit board on which individualized information as serial or part numbers is shown.

In addition, electronic insert 17 engages adjusting projection 16 of beveled front edge unit 5 if both housing units are mounted together.

According to the invention, electronic insert 17 may comprise any electronic circuitry, such as cryptographic processors, memory and processing units for data processing, as used, for example, for the decoding of coded pay-TV signals or may, in a simple embodiment, comprise circuit traces between the receptacle connector 2 and terminal unit 48 carrying contact array 8, shown in FIGS. 8 and 9, to establish an electrical connection between terminals of receptacle connector 2 and contact pads of smart card 7.

According to the invention, a plurality of different electronic inserts 17 may be used together with the upper and the lower housing unit 25 and 12, however, the invention is not limited to any specific electronic inserts.

Assembly of the respective smart card reader requires only insertion of electronic insert 17 into upper sheet metal cover 33 and pressing of lower sheet metal cover 13 onto upper sheet metal cover 33 until mounting flanges 28 and 29 snap over flanges 20 and 21. Consequently, the portable smart card reader assembly can be manufactured manually as well as robotically, e.g. by means of an automated product line.

To obtain a better understanding of the internal configuration, reference is made now to FIGS. 10 to 13, wherefrom the internal configuration of smart card reader assembly 1 is seen in more detail. Printed circuit board 49 of electronic insert 17 extends in the housing cavity 50 which essentially is defined by upper and lower sheet metal covers 13 and 33. Printed circuit board 49 supports terminal unit 48 whereas terminal unit 48 mounts terminals 51 and 52 of terminal array 8 associated with respective contact pads on smart card 7. As the invention is not limited by any specific kind of terminals or contacts, no detailed description is given thereof. Sheet metal hook 54 extending into slot 4 at the rearward end thereof provides for increased tactile resistance encountered when inserting smart card 7 into slot 4. In an alternative embodiment shown in FIG. 8, flap 3 of top cover 45 and upper sheet metal cover 13 define an opening 53 exposing a section of printed circuit board 49 on which data of the smart card reader assembly can be read.

Although the above-described embodiments describe PCMCIA cards, the invention may also be applied to other rectangular card reader housing types.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A portable smart card reader assembly comprising an upper housing unit (25) having a first set of mounting means (28, 29), and an lower housing unit (12) having a second set of mounting means (20, 21), said upper housing unit (25) and said lower housing unit (12) together defining a cavity (50) for accommodating an electronic insert (17), said electronic insert (17) comprising a receptacle connector (2) for establishing electronic contact with an associated electronic device and a contact array (8) having terminals (51, 52) designed to mate with contact pads on a smart card (7) upon insertion of the smart card (7) into the portable smart card reader assembly (1), wherein upon mating said upper housing unit (25) with said lower housing unit (12) said first set of mounting means (28, 29) and said second set of mounting means (20, 21) are moved into locking engagement, and wherein said upper housing unit (25) comprises a dielectric top cover (45) integral with and generally above an upper sheet metal cover (33).

2. A portable smart card reader according to claim 1, wherein said first set of mounting means (28, 29) comprises at least one essentially u-shaped lateral mounting flange and said second set of mounting means (20, 21) comprises at least one essentially inwardly inclined mounting flange.

3. A portable smart card reader according to claim 1, wherein said upper housing unit (25) comprises a generally planar stamped and formed upper sheet metal cover (33) and said lower housing unit (12) comprises a generally planar stamped and formed lower sheet metal cover (13).

4. A portable smart card reader according to claim 1, wherein said at least one generally u-shaped lateral mounting flange (28, 29) is a laterally bent portion of the upper sheet metal cover (33) and wherein said at least one inwardly inclined mounting flange (20, 21) is a laterally bent portion of the lower sheet metal cover (13).

5. A portable smart card reader according to claim 1, wherein said lower housing unit (12) comprises a beveled dielectric front edge unit (5).

6. A portable smart card reader according to claim 1, wherein said upper housing unit (25) defines guiding flaps (30, 31) laterally engaging said beveled dielectric front edge unit (5) of said lower housing unit (12) upon mating of both housing units (12, 25).

7. A portable smart card reader according to claim 1, wherein said dielectric top cover (45) and said upper sheet metal cover (33) define a laterally open slot (40) for inserting said smart card (7).

8. A portable smart card reader according to claim 1, wherein said dielectric top cover (45) defines a mounting portion (32) for mounting the upper sheet metal cover (33).

9. A portable smart card reader according to claim 8, wherein said top cover mounting portion (32) for the upper sheet metal cover (33) comprises partially L-shaped side walls (34, 35, 36, 37) for lateral press fit engagement with mounting tabs (38, 39) of the upper sheet metal cover (33).

10. A portable smart card reader according to claim 1 wherein said dielectric top cover (45) further defines mounting portions (26, 27) for mounting lateral flaps (23, 24) of the lower sheet metal cover (13), said mounting portions comprising at least one longitudinal opening (26, 27) for press fit engagement of the lateral flaps (23, 24) of the lower sheet metal cover (13).

11. A portable smart card reader according to claim 1 wherein said dielectric top cover (45) further has lateral guide posts (46,47) for lateral alignment with respective u-shaped lateral flanges of the upper sheet metal cover (33).

12. A portable smart card reader according to claim 1, wherein said upper sheet metal cover (33) defines a central opening wherein said upper sheet metal cover (33) defines a central opening (40) to expose a terminal array (8, 48, 51, 52) of the electronic insert (17).

13. A portable smart card reader according to claim 5, wherein said dielectric beveled front edge unit (5) comprises a pair of parallel extending legs (14, 15) having an essentially L-shaped cross section.

14. A portable smart card reader according to claim 13, wherein each of said parallel extending legs (14, 15) defines an adjusting projection (16) for a position adjustment of the printed circuit board (49) of the electronic insert (17).

15. A portable smart card reader according to claim 1, wherein said dielectric top cover (45) has an opening (53) exposing portions of said opening in the upper sheet metal cover (33) or of the upper sheet metal cover (33).

16. A portable smart card reader according to claim 1, wherein said lower sheet metal cover (13) has a tub-shaped central portion (10) defining an enlarged volume of internal housing cavity.

17. A portable smart card reader according to claim 1, wherein said-upper and said lower sheet metal covers (13, 33) are internally covered with an insulating layer.

* * * * *